March 6, 1973 H. VOIGTLÄNDER 3,719,290

DISCHARGE HEAD FOR A BIN, ESPECIALLY A BULK METERING BIN

Filed June 8, 1971

INVENTOR
HERBERT VOIGTLAENDER

BY W. G. Fasse
ATTORNEY

United States Patent Office 3,719,290
Patented Mar. 6, 1973

3,719,290
DISCHARGE HEAD FOR A BIN, ESPECIALLY A BULK METERING BIN
Herbert Voigtländer, Weiterstadt, Germany, assignor to Carl Schenck Maschinenfabrik G.m.b.H., Darmstadt, Germany
Filed June 8, 1971, Ser. No. 150,970
Claims priority, application Germany, June 30, 1970, P 20 32 128.2
Int. Cl. B65g 65/42
U.S. Cl. 214—17 D
10 Claims

ABSTRACT OF THE DISCLOSURE

The present discharge head is intended for removing a plurality of even and uniform flows of material, such as chips and fibers intermixed with binders from a bin. This is accomplished by a first row of spiked rollers inclined toward the horizontal and by at least one flow dividing means which may also comprise a row of spiked rollers or an endless conveyor belt. The second row forms an angle with the horizontal which is more acute than the respective angle between the first row and the horizontal.

BACKGROUND OF THE INVENTION

The present invention relates to a discharge head with rollers, especially for a bin or metering bin for supplying chip and/or fiber materials intermixed with binder means to a spreading device, especially for the storage and moving of such chip and/or fiber materials in connection with the production of chip boards which are provided with a fiber cover layer by means of a spreading device.

Conventional metering bins for spreading devices comprise a discharge apparatus which in turn includes a system or set of spaced spiked rollers arranged above each other to form a row as described in German Pat. 1,084,199. Said spiked rollers remove the material from the leading surface of a mass of such material or materials. A disadvantage of said conventional discharge devices is seen in the arrangement of a single discharge opening through which the chip material is fed to a single spreading device as it is removed or milled away by said spiked rollers. In this fashion it is not possible to use the milling capability or capacity of the spiked rollers of the storage bin in an efficient manner because the amount of through-put of a single spreading device is limited.

OBJECTS OF THE INVENTION

In view of the foregoing it is the main object of the invention to remove the drawbacks of the prior art.

Yet another object of the invention is to make full and efficient use of the possible milling capacity of the spiked rollers and thus of the discharge capability of the metering bin.

A still further object of the invention is to adapt the out-put of a metering bin to the capability of the following spreading devices so that more than one spreading device may be supplied simultaneously with a uniform flow of material to be spread.

It is also an object of the invention to provide a discharge head for a metering bin which, with modifications, may be used in connection with many kinds of bulk materials, such as chips and fibers intermixed with binder means or granular material which may also be mixed with binder means.

Yet another object of the invention is to divide the flow of mixed bulk materials which may even include binder means into evenly divided partial flows, whereby the composition of the mixture must not be disturbed, stated differently, the composition of each partial flow must be the same as that of the starting mixture.

A still further object of the invention is to provide a device for uniformly feeding bulk materials into a plurality of spreaders, for example, in the production of hard boards, chip boards, and/or fiber boards.

SUMMARY OF THE INVENTION

According to the invention there is provided a discharge head for a bin, especially a metering bin, wherein a plurality of spiked rollers are rotatably supported for removing the bulk material from the bin to produce a first flow of removed or milled off chip and/or fiber material. A flow dividing means follows in the direction of flow or downstream of said spiked rollers, whereby the flow is divided without changing its composition. The flow dividing means advance or move the partial flows to separate spreading devices or other further handling means.

It is an advantage of the present invention that it accomplishes for the first time to distribute the material supply which is milled off by the spiked rollers without changing its composition in such a manner that larger spreading capacities are achieved while simultaneously fully utilizing the milling capacity of said spiked rollers.

BRIEF DESCRIPTION OF THE DRAWINGS

In order that the invention may be clearly understood, it will now be described with reference to the accompanying drawings, wherein:

FIG. 1 is a side view, partially in section, of a discharge head according to the invention;

DETAILED DESCRIPTION OF EXAMPLE EMBODIMENTS

Figure 2:
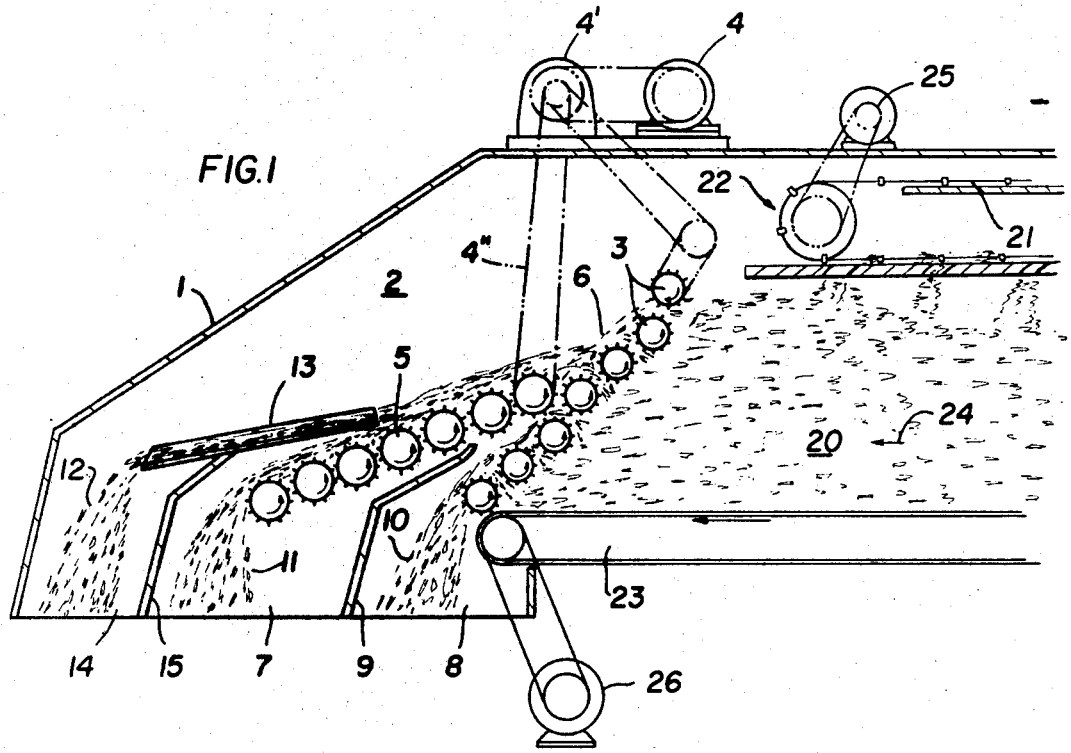
FIG. 2 illustrates a partial view similar to that of FIG. 1 with a modified flow dividing means.

FIG. 1 shows a sectional side view of a metering bin having a housing 1 including side walls 2. The bulk material 20 is moved into the housing 1 by means of a first or upper conveyor 21 in the manner as disclosed in more detail in the above mentioned German Pat. 1,084,199. The bulk material 20 drops by gravity through perforations in the upper and lower runs of the upper conveyor 21 to form a pile on the moving bottom of the housing 1. Said moving bottom is provided in the form of a further lower conveyor 23, the upper run of which moves in the same direction as the upper run of the conveyor 21. The lower conveyor 23 extends with its end adjacent to a row of spiked rollers 3 horizontally beyond a vertical line through the respective end 22 of the material feed-in conveyor 21 whereby the leading flank of the advancing material 20 is slanted. The entire arrangement is such that the material first fed into the bin is also first fed out of the bin.

The bulk material may comprise, for example, a mixture of chips and/or fibers for producing of chip boards, especially chip boards comprising cover layers of most finely divided materials or fibers.

The two conveyors 21 and 23 tend to advance the pile of material in the direction of the arrow 24 toward said row of spiked rollers 3 which are arranged to face the leading flank of the pile of material for constantly milling off the material from the pile to produce a first flow 6 of material without changing the composition of the material. For this purpose, the row of spiked rollers 3 is arranged at an angle relative to the horizontal or relative to the horizontal upper run of conveyor 23 which angle corresponds substantially to the angle which is included between the flank of the pile of material and the horizontal. The rollers 3 extend over the entire width of the metering bin and are driven by a motor 4 through speed adjusting means, for example, gear means 4'.

According to the invention there are provided one or several sets of flow dividing means which separate the main flow 6 of the materials into several partial flows 10, 11, and 12.

In the embodiment of FIG. 1, a first set of flow dividing means comprises also spiked rollers 5 rotatably supported in said bin housing 1 and also driven, for example, by the motor 4 through conventional drive transmitting means 4''. The spiked rollers 5 divide out of the main flow 6 of material a partial flow 11. By rotating the spiked rollers 5 in the same direction, they simultaneously advance the partial flow 11 toward a discharge opening 7 of the housing 1 while the partial flow 10 is discharged through its respective discharge opening 8.

In the embodiment of FIG. 1, the second or partial flow 11 is further divided by second flow dividing means, such as a chute 13 which may, for example be a vibrating chute which itself is well known in the art. In any event, the speed of the spiked rollers 5 as well as of the spiked rollers 3 and the vibrating of the chute 13 is adjusted in such a manner that the partial flows are all equal to each other as far as the composition of materials is concerned and are uniform enough so as to produce respective chip or fiber fleeces which are continuously discharged through the openings 7, 8 and 14. These openings are separated from each other, for example, by baffles 9 and 15. Underneath the discharge openings 7, 8, and 14 there may be arranged, for example, spreading devices (not shown) as they are well known in the art.

FIG. 2 ilustrates a modification, wherein the spiked rollers 5 of the flow dividing means according to FIG. 1 have been replaced by an endless conveyor belt 5' which may also be driven either by the same drive means which drive the spiked rollers 3 or by separate drive means well known in the art.

Figure 3:
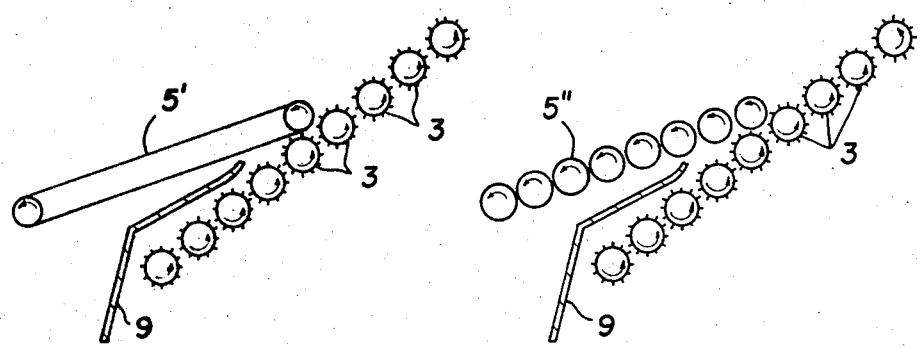
FIG. 3 illustrates a view similar to that of FIG. 2 but showing a still further modification of the flow dividing means.

The embodiment of FIG. 3 is quite similar to the previous embodiment except that the flow dividing means 5 have been replaced by a set of rollers forming a conveyor 5''. It will be appreciated that any of these modifications may be employed in combination with any other modification of the flow dividing and material advancing means, such as have been illustrated, for example, at 5, 5', and 5''.

In each of these embodiments, the baffles 9 and 15 assure that an intermixing of the downwardly advancing curtain or flow of materials is prevented.

Furthermore, where several flow dividing and advancing means are arranged in succession, it is possible to drive these means independently of each other and to arrange these means slightly above each other but so that the first flow dividing means, for example, the spiked rollers 5 adjoin the material removing spiked rollers 3, whereby each successive flow dividing and advancing means will form a slightly more acute angle to the horizontal than the preceding flow dividing and advancing means. In this manner, a plurality of spreading devices may be supplied with uniform flows of material, whereby the quantity of material and the flow may be easily adjusted, either by adjusting the speed of said flow dividing and advancing means in common or by controlling the speed individually for each flow dividing and advancing means, especially in the embodiment which comprises a plurality of such means. In any event, the speed adjustment will be adapted to the particular requirements of the spreading or other devices to be supplied with uniform flows of bulk material.

The present apparatus with its speed control achieves the inventive advantage that a single metering bin can uniformly supply a plurality of further handling devices arranged downstream of the supply bin and the supply may be adjusted in accordance with the handling e.g. spreading capacity of the respective device without employing additional intermediate conveyor and/or flow equalizing devices. It has been found, that the use of such intermediate advancing and equalizing devices influences the quality and uniformity of the materials in an undesirable manner, particularly where most finely divided chips or fibers are to be supplied to spreading devices in the production of chip or fiber boards.

Incidentally, the conveyors 21 and 23 may be driven in the same direction by motors 25, 26 as is well known.

The chute 13 may be vibrated, for example, by driven cam means which impart to the chute a motion back and forth, preferably laterally, along a path determined by the shape of said cam means. In this connection, several motion components may be superimposed to impart to the chute the desired material advancing vibration.

Although the invention has been described with reference to specific examples, it is to be understood, that it is intended to cover all modifications and equivalents within the scope of the appended claims.

What I claim is:

1. A discharge head for a bin which bin contains bulk materials, comprising a housing forming a discharge end of said bin, material removing means rotatably supported in said housing and facing said bulk material, first drive means operatively connected to said material removing means for producing a uniform and continuous main flow of materials, a number of flow dividing means movably supported in said housing for dividing said main flow into a plurality of partial material flows, each of said flow dividing means having an upper end, wherein the upper end of a first flow dividing means reaches into said main flow of materials for branching a first partial flow out of said main flow, and wherein the upper end of each successive flow dividing means reaches into the preceding partial material flow to produce said plurality of partial material flows, further drive means operatively connected to said flow dividing means for advancing said partial material flows, and flow discharge means arranged in said housing for individually receiving each of said material flows.

2. The discharge head according to claim 1, comprising speed control means operatively connected to said further drive means for controlling the movement of said flow dividing means.

3. The discharge head according to claim 2, wherein said speed control means comprise drive transmission means for individually controlling the movement of each of said plurality of flow dividing means.

4. The discharge head according to claim 1, wherein said material removing means comprise a set of rotatable rollers arranged in parallel to each other and having spiked surfaces facing said bulk material.

5. The discharge head according to claim 1, wherein said flow dividing means comprise at least one endless conveyor belt driven by said further drive means.

6. The discharge head according to claim 1, wherein said flow dividing means comprise at least one set of rollers arranged in parallel to each other, whereby each roller set forms a respective material advancing surface driven by said further drive means.

7. The discharge head according to claim 6, wherein said rollers are also spiked rollers driven by said further drive means.

8. The discharge head according to caim 1, wherein said flow dividing means comprise a plurality of chutes.

9. The discharge head according to claim 1, wherein said bin is a metering bin and wherein the metering is accomplished by regulating the speed of said drive means.

10. The discharge head according to claim 4, wherein said spiked, parallel rollers are arranged in a row extending at an angle relative to the horizontal to face the bulk materials at said angle, and wherein said flow dividing means are also arranged at respective angles relative to the horizontal, whereby each successive angle is more acute than the preceding angle.

References Cited
UNITED STATES PATENTS

| | | | |
|---|---|---|---|
| 3,498,505 | 3/1970 | Wirz | 222—254 |
| 1,854,099 | 4/1932 | Bokum et al. | 214—17 D |

ROBERT G. SHERIDAN, Primary Examiner

U.S. Cl. X.R.

198—58, 66; 222—254, 272